United States Patent
Boivie

(10) Patent No.: US 9,372,967 B2
(45) Date of Patent: *Jun. 21, 2016

(54) SUPPORT FOR SECURE OBJECTS IN A COMPUTER SYSTEM

(71) Applicant: International Business Machines Corporation, Armonk, NY (US)

(72) Inventor: Richard H. Boivie, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/454,075

(22) Filed: Aug. 7, 2014

(65) Prior Publication Data

US 2015/0019876 A1    Jan. 15, 2015

Related U.S. Application Data

(63) Continuation of application No. 12/492,738, filed on Jun. 26, 2009, now Pat. No. 8,819,446.

(51) Int. Cl.
*G06F 11/30* (2006.01)
*G06F 21/12* (2013.01)
*G06F 21/72* (2013.01)

(52) U.S. Cl.
CPC .............. *G06F 21/125* (2013.01); *G06F 21/72* (2013.01); *G06F 2221/07* (2013.01)

(58) Field of Classification Search
CPC .................................. G06F 21/71; G06F 21/72
USPC .................................................. 713/189–193
See application file for complete search history.

(56) References Cited

U.S. PATENT DOCUMENTS

| | | |
|---|---|---|
| 5,222,139 A | 6/1993 | Takaragi et al. |
| 5,481,613 A | 1/1996 | Ford et al. |
| 5,748,782 A | 5/1998 | Ferreira et al. |
| 5,845,281 A | 12/1998 | Benson et al. |
| 6,185,685 B1 | 2/2001 | Morgan et al. |
| 6,397,331 B1 | 5/2002 | Ober et al. |
| 6,523,118 B1 | 2/2003 | Buer |
| 6,704,871 B1 | 3/2004 | Kaplan et al. |
| 6,708,273 B1 | 3/2004 | Ober et al. |
| 6,751,709 B2 | 6/2004 | Seidl et al. |
| 6,968,420 B1 | 11/2005 | Giles et al. |

(Continued)

FOREIGN PATENT DOCUMENTS

| | | |
|---|---|---|
| CN | 1309351 A | 8/2001 |
| JP | H 07287514 A | 10/1995 |

(Continued)

OTHER PUBLICATIONS

Suh et al., Efficient Memory Integrity Verification and Encryption for Secure Processors, 36th International Symposium on Microarchitecture, 2003 I EEE, pp. 1-12.*

(Continued)

*Primary Examiner* — Roderick Tolentino
(74) *Attorney, Agent, or Firm* — Jeff LaBaw, Esq.; McGinn IP Law Group, PLLC

(57) ABSTRACT

A method and structure in a computer system, including a mechanism supporting a Secure Object that includes code and data that is cryptographically protected from other software on the computer system.

18 Claims, 8 Drawing Sheets

(56) References Cited

U.S. PATENT DOCUMENTS

| | | | |
|---|---|---|---|
| 7,055,040 B2 | 5/2006 | Klemba et al. | |
| 7,136,488 B2 | 11/2006 | Hashimoto et al. | |
| 7,167,956 B1 | 1/2007 | Wright et al. | |
| 7,249,225 B1 | 7/2007 | Seidl et al. | |
| 7,260,726 B1* | 8/2007 | Doe | G06F 21/34 380/228 |
| 7,290,288 B2 | 10/2007 | Gregg et al. | |
| 7,483,930 B1 | 1/2009 | Wright et al. | |
| 7,516,331 B2 | 4/2009 | Jin et al. | |
| 7,747,877 B2 | 6/2010 | Jin et al. | |
| 7,865,488 B2 | 1/2011 | Bhide et al. | |
| 7,933,413 B2 | 4/2011 | Steeves et al. | |
| 8,041,947 B2* | 10/2011 | O'Brien | G06F 21/572 713/165 |
| 8,055,910 B2 | 11/2011 | Kocher et al. | |
| 8,086,871 B2 | 12/2011 | McIntosh et al. | |
| 8,108,641 B2 | 1/2012 | Goss et al. | |
| 8,381,288 B2 | 2/2013 | Sahita et al. | |
| 8,392,725 B2 | 3/2013 | McIntosh et al. | |
| 8,464,011 B2 | 6/2013 | Krig | |
| 8,479,286 B2 | 7/2013 | Dalcher et al. | |
| 8,572,400 B2 | 10/2013 | Lin et al. | |
| 8,738,932 B2 | 5/2014 | Lee et al. | |
| 2001/0010722 A1 | 8/2001 | Enari | |
| 2001/0014157 A1 | 8/2001 | Hashimoto et al. | |
| 2001/0050990 A1 | 12/2001 | Sudia | |
| 2002/0064283 A1 | 5/2002 | Parenty | |
| 2002/0172368 A1 | 11/2002 | Peterka | |
| 2004/0039926 A1 | 2/2004 | Lambert | |
| 2004/0123127 A1 | 6/2004 | Teicher et al. | |
| 2004/0139346 A1* | 7/2004 | Watt | G06F 21/74 713/166 |
| 2004/0181303 A1 | 9/2004 | Walmsley | |
| 2005/0038998 A1* | 2/2005 | Ueno | G06F 21/34 713/165 |
| 2005/0044390 A1 | 2/2005 | Trostle | |
| 2005/0076226 A1 | 4/2005 | Boivie et al. | |
| 2005/0105738 A1 | 5/2005 | Hashimoto | |
| 2005/0166069 A1 | 7/2005 | Hashimoto et al. | |
| 2005/0177742 A1 | 8/2005 | Benson et al. | |
| 2006/0106801 A1 | 5/2006 | Cox et al. | |
| 2006/0156418 A1 | 7/2006 | Polozoff | |
| 2006/0242611 A1* | 10/2006 | Drake | G06F 15/7867 326/38 |
| 2007/0006294 A1 | 1/2007 | Hunter | |
| 2007/0047735 A1 | 3/2007 | Celli et al. | |
| 2007/0101124 A1 | 5/2007 | Pitts | |
| 2007/0133795 A1 | 6/2007 | Kahn et al. | |
| 2008/0072068 A1 | 3/2008 | Wang et al. | |
| 2008/0109903 A1 | 5/2008 | Werner et al. | |
| 2008/0155273 A1 | 6/2008 | Conti | |
| 2008/0205651 A1 | 8/2008 | Goto et al. | |
| 2008/0222420 A1 | 9/2008 | Serret-Avila | |
| 2008/0270806 A1 | 10/2008 | Nakamura | |
| 2008/0288786 A1 | 11/2008 | Fiske | |
| 2008/0301441 A1* | 12/2008 | Calman | G06F 21/56 713/168 |
| 2009/0006796 A1 | 1/2009 | Chang et al. | |
| 2009/0006864 A1 | 1/2009 | Hashimoto et al. | |
| 2009/0217385 A1* | 8/2009 | Teow | G06F 21/604 726/27 |
| 2009/0259857 A1 | 10/2009 | Gehrmann | |
| 2009/0300366 A1* | 12/2009 | Gueller | G06F 21/51 713/189 |
| 2009/0319782 A1 | 12/2009 | Lee | |
| 2010/0031061 A1* | 2/2010 | Watanabe | G06F 21/80 713/193 |
| 2010/0119068 A1* | 5/2010 | Harris | G06F 21/123 380/251 |
| 2010/0153746 A1 | 6/2010 | Takeuchi et al. | |
| 2010/0161904 A1 | 6/2010 | Cypher et al. | |
| 2010/0262824 A1 | 10/2010 | Keshavachar et al. | |
| 2010/0281273 A1 | 11/2010 | Lee et al. | |
| 2011/0064217 A1 | 3/2011 | Fry et al. | |

FOREIGN PATENT DOCUMENTS

| | | |
|---|---|---|
| JP | 2001-230770 A | 8/2001 |
| JP | 2001-318787 A | 11/2001 |
| JP | 2002-232417 A | 8/2002 |
| JP | 2006-018528 A | 1/2006 |
| JP | 2006-227777 A | 8/2006 |
| JP | 2006-309766 A | 11/2006 |
| JP | 2007-514994 A | 6/2007 |
| JP | 2007-233426 A | 9/2007 |
| JP | 2008-210225 A | 9/2008 |
| TW | 200822068 A | 5/2008 |
| TW | 200841682 A | 10/2008 |
| WO | WO 98/54633 A1 | 12/1998 |
| WO | WO 2005-096120 A1 | 10/2005 |
| WO | WO 2008/003833 A1 | 1/2008 |

OTHER PUBLICATIONS

Yang et al., Fast Secure Processor for Inhibiting Software Piracy and Tampering, 36th International Symposium on Microarchitecture, 2003 IEEE, pp. 1-10.*

United States Notice of Allowance dated Jul. 7, 2014 in U.S. Appl. No. 13/033,455.

United States Office Action dated Dec. 3, 2014, in U.S. Appl. No. 14/454,075.

United States Office Action dated Mar. 13, 2015, in U.S. Appl. No. 13/226,079.

United States Notice of Allowance dated Mar. 26, 2015, in U.S. Appl. No. 14/017,555.

Haifend, "Memory Confidentiality and Integrity Protection Method Based on Variable Length Counter", Dec. 1, 2014, Journal of Algorithms & Computational Technology, pp. 421-439.

Haifeng, et al. "Memory Confidentiality and Integrity Protection Method Based on Variable Length Counter", 2012, IEEE, p. 290-294.

Frincke, "Developing Secure Objects"; Google, 1995-1996.

Somogyi, et al., "NblDL: Secure, Object-Oriented, Client-Server Middleware", Google, 1998.

SAP Functions in Detail; "Crystal Reports Server—A Functional Overview", Google, 2008.

PCT Notification Concerning Transmittal of International Preliminary Report on Patentability dated Jan. 12, 2012 (PCT Application No. PCT/US2010/001811).

Henry Levy, Capability-Based Computer Systems, Published by Digital Press 1984. http://www.cs.washington.edu/homes/levy/capabook.

Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf—Abstract Only ACM Computing Survey (CSUR), vol. 8, Issue 4, Dec. 1976.

Canetti, et al., "A Two Layers Approach for Securing an Object Store Network", Proceedings of the First International IEEE Security in Storage Work-Shop (2002) (SISW'02), 1-14.

Wang, et al., "Keep Passwords Away from Memory: Password Caching and Verification Using TPM", 22$^{nd}$ International Conference on Advanced Information Networking and Applications, IEEE, 755-762, DOI: 10.1109/AINA, 2008.109.

Catrein, et al. "Private Domains in Networks of Information", IEEE International Conference Communications (ICC) Work-Shops, 2009.1-5.

PCT Notification of Transmittal of the International Search Report and the Written Opinion of the International Searching Authority, or the Declaration dated Oct. 1, 2010.

Williams, et al., "CPU Support for Secure Executables", The 4$^{th}$ International Conference on Trust and Trustworthy Computing, Jun. 22-24, 2011, Pittsburgh, PA.

Williams, et al., "CPU Support for Secure Executables" Stony Brook University, Power Point Presentation at the 4$^{th}$ International Conference on Trust and Trustworthy Computing, Jun. 22-24, 2011, Pittsburgh, PA.

United States Office Action dated Aug. 14, 2013 in U.S. Appl. No. 13/226,079.

(56) References Cited

OTHER PUBLICATIONS

United States Office Action dated Aug. 14, 2013 in U.S. Appl. No. 12/492,738.
United States Office Action dated Nov. 9, 2012 in U.S. Appl. No. 13/033,367.
United Stated Notice of Allowance dated Jul. 23, 2013 in the U.S. Appl. No. 13/033,367.
Haifeng, et al "Memory Confidentiality and Integrity Protection Method Based on Variable Length Counter", 2012, IEEE, p. 290-294.
United States Office Action dated Mar. 25, 2013 in the U.S. Appl. No. 13/033,367.
Suh, et al., Efficient Memory Integrity Verification and Encryption for Secure Processors, 36$^{th}$ International Symposium on Microarchitecture, 2003 IEEE, pp. 1-12.
Yang, et al., Fast Secure Processor for Inhibiting Software Piracy and Tampering, 36$^{th}$ International Symposium on Microarchitecture, 2003, pp. 1-10.
United States Office Action dated Mar. 18, 2013 in U.S. Appl. No. 12/878,696.
United States Office Action dated Nov. 20, 2012 in U.S. Appl. No. 13/033,455.
United States Office Action dated May 30, 2014 in U.S. Appl. No. 14/017,555.
United States Office Action dated Mar. 19, 2014 in U.S. Appl. No. 13/226,079.
United Stated Office Action dated Oct. 4, 2013 in U.S. Appl. No. 12/878,696.
United States Office Action dated Oct. 8, 2014, in U.S. Appl. No. 13/226,079.
United States Office Action dated Dec. 3, 2014, in U.S. Appl. No. 14/017,555.
United States Office Action dated Jun. 26, 2015, in U.S. Appl. No. 12/878,696.
European Search Report dated Mar. 4, 2016.

* cited by examiner

Secure Class Password_table {
  <private data structures>
  <private methods>

// public methods: publically accessible, but implementations are private
  public boolean validatePassword(loginid, password){
    <private code>
  }
  public Boolean changePassword(loginid, oldpassword, newpassword)
    <more private code>
  }
}

FIGURE 1

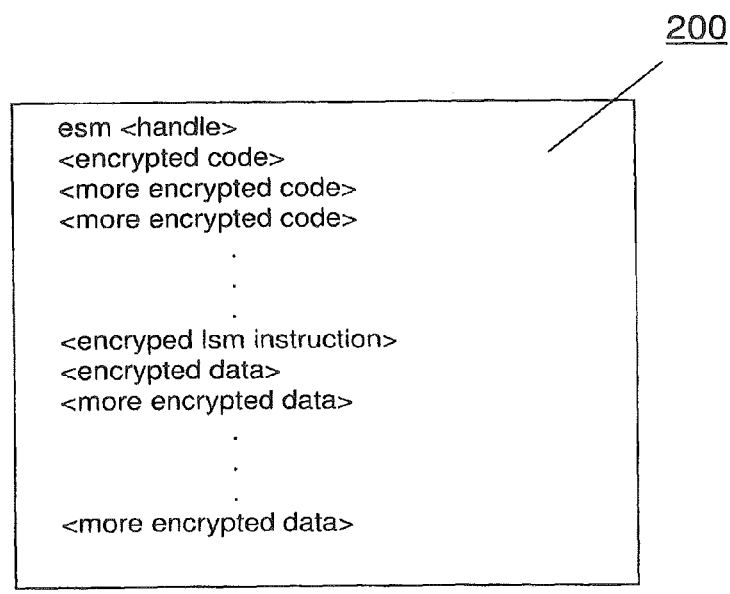
FIGURE 2
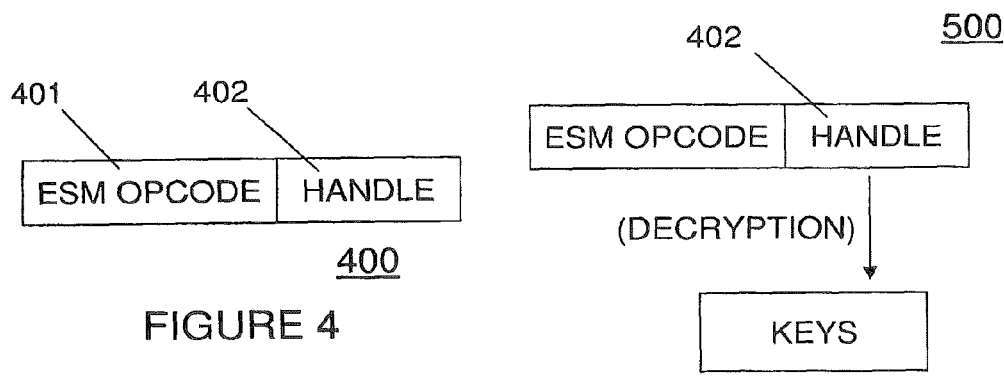
FIGURE 4
FIGURE 5

SUPPORT FOR SECURE OBJECTS IN A COMPUTER SYSTEM

This application is a Continuation application of U.S. patent application Ser. No. 12/492,738, filed on Jun. 26, 2009.

CROSS-REFERENCE TO RELATED APPLICATIONS

The present application is related to the following co-pending application:

U.S. patent application Ser. No. 10/677,933, to R. H. Boivie and W. E. Hall, entitled "Computing Device That Securely Runs Authorized Software", filed on Oct. 1, 2003, published Apr. 7, 2005, as US Patent Publication No. 2005/0076226, and incorporated herein by reference.

BACKGROUND OF THE INVENTION

1. Field of the Invention

The present invention generally relates to the protection of data and software on a computer system from various forms of attack, including protection against attacks from other software on the computer system. More specifically, in an exemplary embodiment, two new machine instructions control encryption/decryption to provide a mechanism by which sensitive software and data in a Secure Object are encrypted at all times except for the period of time that the sensitive software and data are in use inside the CPU.

2. Background/Related Art

The Internet is a powerful tool that has transformed the world. As former chairman and CEO of IBM Lou Gerstner put it "The Internet is nothing less than the single most powerful tool that we have ever seen for driving business, economic and societal change".

But like many tools, this tool can be used for good or ill. Almost every week, we hear of incidents in which systems are compromised and sensitive information is stolen in an Internet-based attack.

Some recent news items include:

Britain's MI5: Chinese Cyberattacks Target Top Companies, The Times (of London), Dec. 3, 2007;

Illicit software blamed for massive data breach: Unauthorized computer programs, secretly installed on servers in Hannaford Brothers supermarkets compromised up to 4.2 million debit and credit cards, AP, Mar. 28, 2008;

Russian Gang Hijacking PC's in Vast Scheme, NY Times, Aug. 6, 2008;

Eight Million People at Risk of ID Fraud after Credit Card Details are Stolen by Hotel Chain Hackers, (UK) Daily Mail, Aug. 25, 2008;

Bank of NY Mellon Data Breach Now Affects 12.5 Million, Reuters, Aug. 28, 2008; and US authorities charged 11 people from five countries with stealing tens of millions of credit and debit card numbers from several retailers including TJX Cos, Reuters Aug. 28, 2008 (a quote from the Bank of NY article above).

And there have been many other similar incidents.

Thus, a need exists for systems and methods that can help prevent the theft of information from a computer system in an Internet-based attack and a need to protect sensitive data and software on a computer system from other software including software that an attacker may be able to introduce into a targeted computer system.

SUMMARY OF THE INVENTION

In view of the foregoing, and other, exemplary problems, drawbacks, and disadvantages of the conventional systems, it is an exemplary feature of the present invention to provide a processor for a computer system, the processor including a mechanism for supporting a Secure Object comprising code and data that is cryptographically protected from other software on the computer system.

It is another exemplary feature of the present invention to provide a structure and method for keeping at least one of data and code that is part of a Secure Object cryptographically protected except when the Secure Object is actually being processed within a CPU.

It is another exemplary feature of the present invention to provide a mechanism including a crypto engine and a machine instruction that loads a key into the crypto engine so that the Secure Object is decrypted when it enters into the CPU for processing of the Secure Object.

Therefore, in a first exemplary aspect, described herein is a processor in a computer system that incorporates a mechanism supporting a Secure Object that includes code and data that is cryptographically protected from other software on the computer system.

In a second exemplary aspect, also described herein is a mechanism including a crypto engine and an instruction that loads a key into the crypto engine to provide access to the Secure Object while the code of the Secure Object is executing on the processor.

In a third exemplary aspect, also described herein is a method of protecting private information and a storage medium storing the machine-readable instructions that execute that method.

In a fourth exemplary aspect, also described herein is a data structure tangibly embodied in a machine-readable storage medium that is cryptographically protected from other software on a computer system.

In a fifth exemplary aspect, also described herein is a machine instruction that provides a mechanism supporting a Secure Object that includes code and data that is cryptographically protected from other software on a computer system.

The present invention, therefore, provides a new machine instruction and data structure such that the private data of the data structure is cryptographically protected at all times except during processing within a CPU on a computer system, thereby providing protection of that private data from other software on the computer system.

BRIEF DESCRIPTION OF THE DRAWINGS

The foregoing and other purposes, aspects and advantages will be better understood from the following detailed description of an exemplary embodiment of the invention with reference to the drawings, in which:

FIG. 1 exemplarily illustrates a high-level language description of a Secure Object 100 that includes code and data that is cryptographically protected from other software;

FIG. 2 is an illustration of a low-level implementation 200 (e.g., the compiled version) of a Secure Object;

FIG. 4 illustrates the esm instruction format 400 used to implement Secure Objects;

FIG. 5 exemplarily illustrates the concept 500 of a second exemplary embodiment, wherein the handle of the esm instruction is decrypted to find the encryption/decryption keys;

EXEMPLARY EMBODIMENTS OF THE INVENTION

Figure 3:
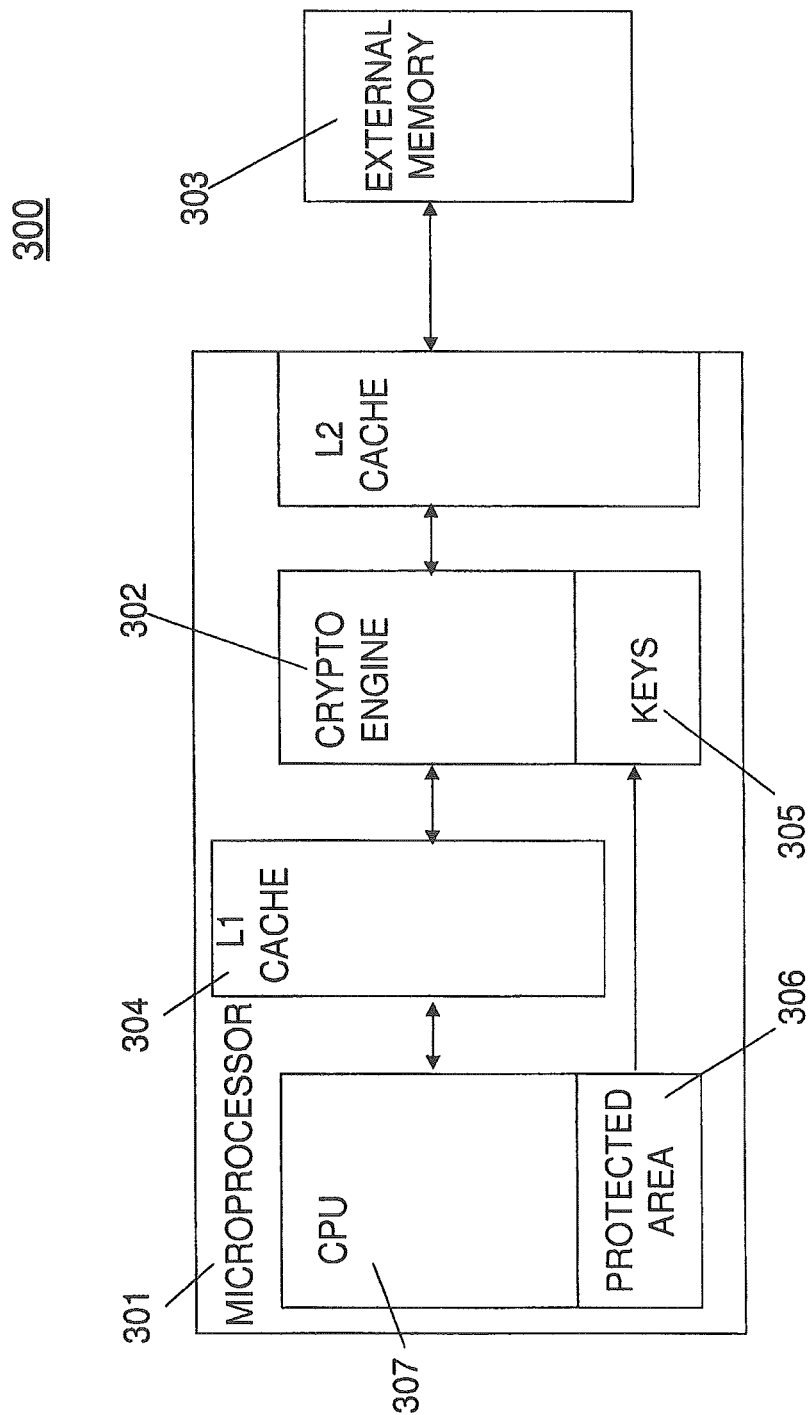
FIG. 3 shows an exemplary block diagram 300 of a microprocessor that provides support for Secure Objects.

Referring now to the drawings, exemplary embodiments of the method and structures according to the present invention are now explained.

The present invention provides mechanisms for implementing a new construct, the Secure Object, that provides strong defenses against software attacks. The Secure Object, like objects in other object-oriented programming languages, contains data and code that manipulates and provides access to that data. A Secure Object differs from objects in existing programming languages such as Java, in that the Secure Object's private code and data are cryptographically protected so that no other software can access the Secure Object's private information.

FIG. 1 provides an example of what a Secure Object 100 might look like in a high-level programming language. This Secure Object includes private data 101 and private methods 102, as well as methods that allow access to the Secure Object through its public interfaces 103, 105. Secure Objects can be used by other software (that is, other software can "call" or "send messages" to a Secure Object) but other software can only access a Secure Object through its public interfaces 103, 105.

In a Secure Object based system, private information is almost always encrypted. It is encrypted while it is in memory and while it is on disk, whether it is in a paging system or in a file system.

FIG. 2 shows how the compiled version 200 of a Secure Object might appear in memory.

A Secure Object's private information is "in the clear" only when:

It is accessed from inside the Secure Object; and
Only while that information is inside the microprocessor.

Since no other code has access to a Secure Object's private information, a software attack that gets into a system through a vulnerability in another software module has no means of accessing the unencrypted version of the Secure Object's private information. As demonstrated in FIG. 2, the private information that is encrypted can include private code as well as private data—corresponding to the private code 102 and private data 101 in FIG. 1.

In an exemplary embodiment used for explaining the concepts of the invention, this new design includes two new instructions that are used to enter and leave a public method of a Secure Object, "esm" and "lsm", for "enter secure method" and "leave secure method", respectively.

The esm instruction loads some crypto key information into special registers that are used to decrypt a Secure Object's private code and data as the code and data move from memory into the microprocessor. Other data such as the arguments passed to the method and the return address that was saved when the Secure Object was called are accessed without this decryption.

FIG. 3 is a block diagram 300 of a microprocessor 301 that provides support for Secure Objects. This microprocessor executes code much like microprocessors in common use today but includes a crypto-engine 302 for (1) decrypting sensitive information as that information moves from external memory 303 into the L1 cache 304 and (2) encrypting sensitive information as it moves from the L1 cache 304 to external memory 303. This cryptography is used to ensure that other software including viruses, worms and other "attack software" will not be able to obtain the unencrypted version of sensitive information.

FIG. 3 also shows a block 305 labeled "keys" within the crypto engine that holds the keys that are used in the encryption and decryption processes. The keys block might include a set of crypto registers specifically designated for holding these keys. It is noted that the crypto engine 302 could be a coprocessor associated with the processor 307, or the crypto engine could be a function executed by the CPU processor itself.

The lsm instruction, which can simply consist of an opcode, restores the previous state of the special crypto registers 305, so that ordinary non-secure code can execute without this encryption and decryption when the secure method returns.

In the Secure Object system, the keys 305 that are used to decrypt a Secure Object's private information are available to the Secure Object but these keys are not available to any other code.

The esm instruction 400, as shown exemplarily in FIG. 4, has an op code field 401 and an operand field 402, referred to as its "handle" that is used to load the keys into the special crypto key registers in keys block 305 to provide access to the Object's private data. But since the keys that are used to decrypt an Object's private information must not be available to any other code, the handle provides an indirect reference to the crypto key information that is not usable by other software. This process will be described in more detail below.

Inside a Secure Object, private information is decrypted on the path from memory 303 to CPU 307 and encrypted on the path from CPU 307 to memory 303. The cryptography includes cryptographic integrity values to protect the integrity of a Secure Object's private code and data as well their confidentiality. Thus if an adversary or a software bug or software attack from another software module 'tampers' with an object's private code or data, the crypto hardware will generate a cryptographic integrity exception when the object next accesses that code or data.

By contrast, when the secure object updates its private data 101, the Object's keys are used to update its cryptographic integrity values so that when the Object later accesses this data no integrity exception will occur. The encryption and decryption process including the cryptographic integrity protection might be done as described in the above-identified co-pending application.

The integrity protection is also essential to protecting the keys that provide access to an Object's private information. If an adversary attempts to use a Secure Object's handle (which is available in the Secure Object's esm instructions) with some other code, the use of this 'other' code will generate a cryptographic integrity exception and its execution will be terminated. Since the keys are not available to the adversary, the adversary cannot generate code that will pass the cryptographic integrity check when the keys are used. And since the adversary has no way of obtaining or using the keys other than via the handle, the adversary has no way of gaining access to the Secure Object's keys or private information.

In one exemplary implementation, the crypto key information, as well as the mappings from handles to keys, are stored in a protected area 306 that cannot be accessed by software. When the CPU executes an esm instruction in this implementation, it takes the handle from the esm instruction, maps that handle to crypto key information and then loads the crypto key information into the special crypto registers in keys block 305.

In a second exemplary implementation 500 shown in FIG. 5, the handle is designed in a way that eliminates the need to store Object crypto key information. In this design, the handle is an encrypted form of the Secure Object's key information—encrypted under a special 'system key' that is not available to software. In this design, the CPU, in executing an esm instruction, uses the system key to decrypt the handle to obtain the Object's key information and then loads the Object's key information into the crypto registers to provide access to the Object's private information. The system key must still be protected, but this design is more scalable since the potentially large number of object keys and the mappings from handles to object keys do not need to be stored.

The details of one method of implementing this encryption, decryption, and integrity checking are described in the above-identified co-pending application.

Figure 6:
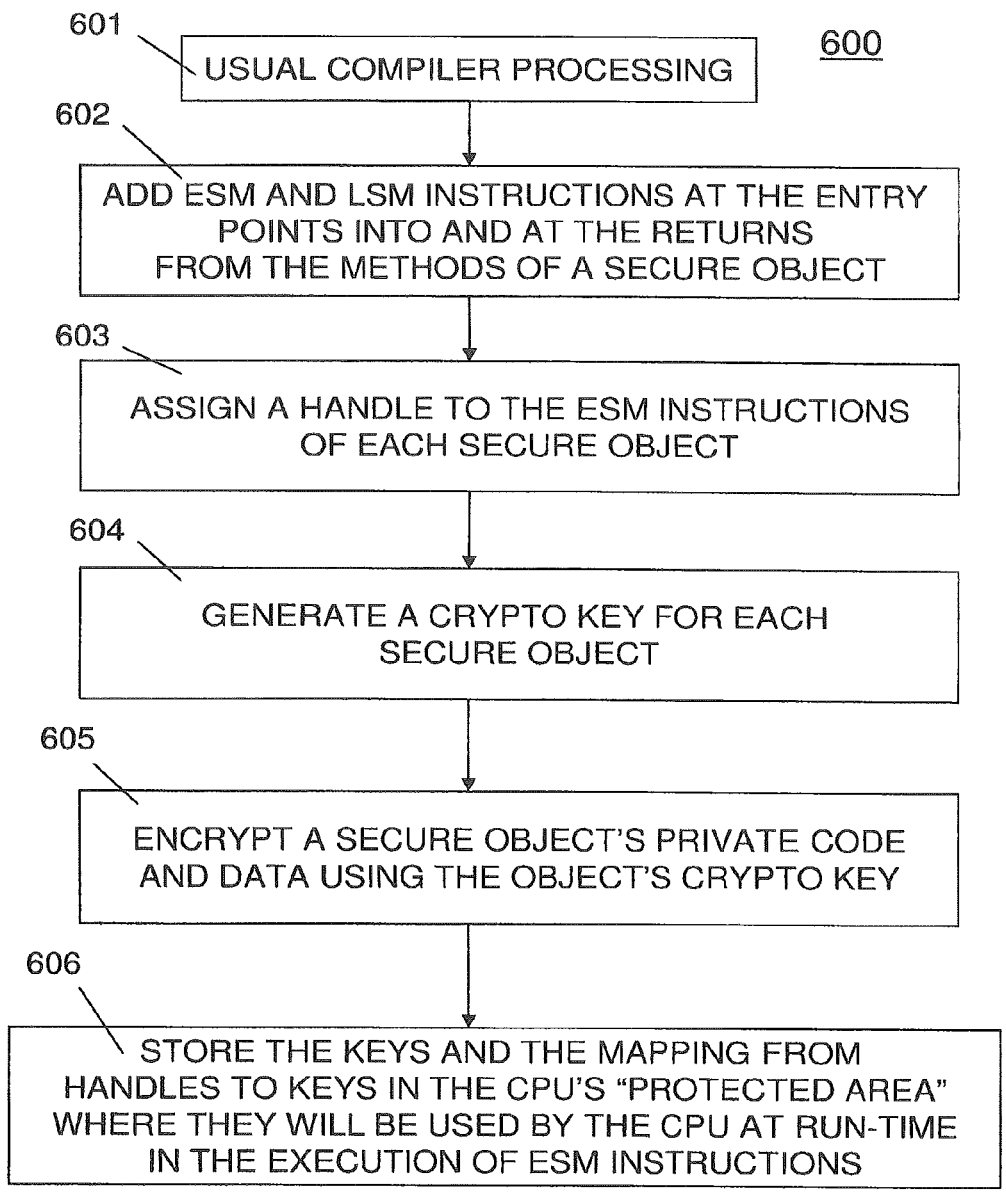
FIG. 6 illustrates the process 600 of building an executable containing Secure Objects, for the first exemplary embodiment.
Figure 7:
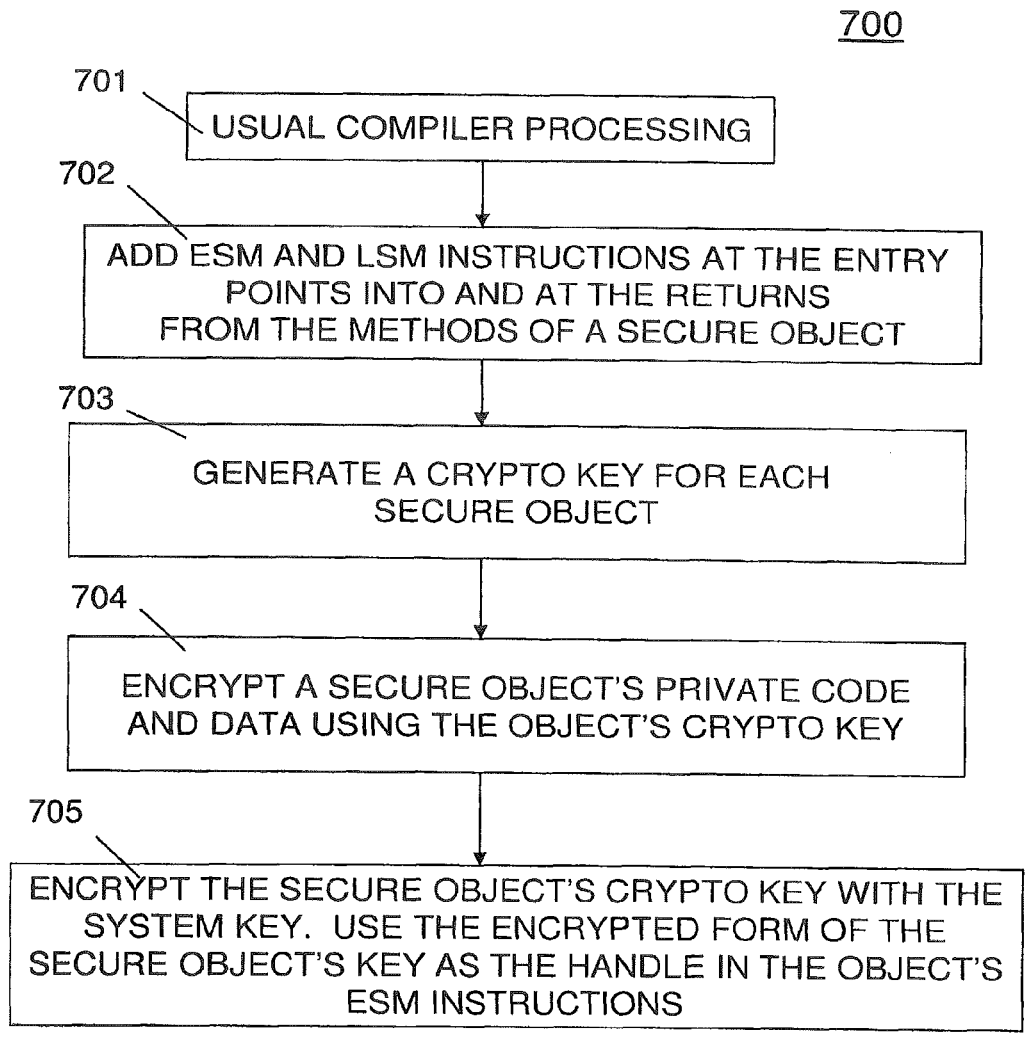
FIG. 7 illustrates another process 700 of building an executable containing Secure Objects, as could be used for the second exemplary embodiment.

FIGS. 6 and 7 exemplarily illustrate the process of building an executable with Secure Objects for these two implementations.

FIG. 6 illustrates the process 600 of building an executable for the first exemplary implementation. In addition to the usual compiler processing 601, in step 602 the compiler will generate esm and lsm instructions at the entry points into and at the returns from the public methods of secure objects. Then, as shown in FIG. 6, additional processing will:

Associate the esm instructions for a given object with a handle (step 603);

Link an object's handle with crypto key information to protect confidentiality and integrity (step 604);

Encrypt the private code and data of each object with its key information (step 605); and Store the key information as well as the mappings from handle to key information in the 'protected area' which is not accessible to most software but is used in the execution of esm instructions (step 606).

FIG. 7 illustrates the process 700 of building an executable for the second exemplary implementation. As in the previous case, the usual compiler processing will be done in step 701 and the compiler will generate esm and lsm instructions at the entry points into and at the returns from the public methods of secure objects in step 702. But in this case, additional processing will Generate crypto key information for each secure object (step 703);

Encrypt the private code and data of each object with its crypto key information (step 704);

Encrypt each object's crypto key information with the special 'system key' (step 705); and Use the encrypted form of each object's key information as the handle in that object's esm instructions (step 705).

This additional processing will be done in a small, carefully reviewed trusted program.

Note that, in the second implementation, this additional processing need not be done on the system where the executable will run. It can be done on a separate development machine and then sent to the desired destination machine for execution.

Once this processing has been completed, the Secure Objects in an executable are "safe". They are protected from bugs in and attacks from other software modules including bugs in and attacks from privileged software such as device drivers, operating systems and hypervisors. In the second implementation above, they are also protected while they are "in transit" from the development machine to the desired destination machine.

This design allows us to know that the contents of a given Secure Object really are secure without having to prove the correctness of millions of lines of OS, middleware and application code. We just need to prove the correctness of the Secure Object mechanisms discussed above and the correctness of the design of the particular Secure Object.

Application of Secure Objects

Secure Objects could be used to avoid the kind of security failures listed in the 'Background' section above. If sensitive information were kept inside Secure Objects, the theft of the 4.2 million credit and debit card records, for example, could have been avoided. The complete list would not be available to any software other than the Secure Object itself and the problem of a software attack on the Secure Object's code could be minimized or avoided by careful design, by keeping the Object's code as small as possible and by carefully reviewing the Object's code for software vulnerabilities. As discussed above, we do not need to prove the correctness of millions of lines of application and system code—just the correctness of the Secure Object.

In addition to securing the Object itself, we also need to protect the paths into and out of the Secure Object so that a software attack cannot "listen in" on these paths and over time collect lots of sensitive information.

These paths can be protected by standard communications security mechanisms. In a "good" design, sensitive information will never by vulnerable. Sensitive information that is sent to a secure object will be protected by communications security mechanisms until it is safely inside the Secure Object. Similarly, sensitive information that is sent from a Secure Object will be protected by communications security mechanisms before it leaves the Secure Object.

In this kind of design, attack software would not be able to obtain any sensitive information from a system. The attack software would not be able to obtain sensitive information residing within a Secure Object and it would not be able to obtain sensitive information as it is sent to or received from a Secure Object.

Objects that Call Other Objects

Figure 8:
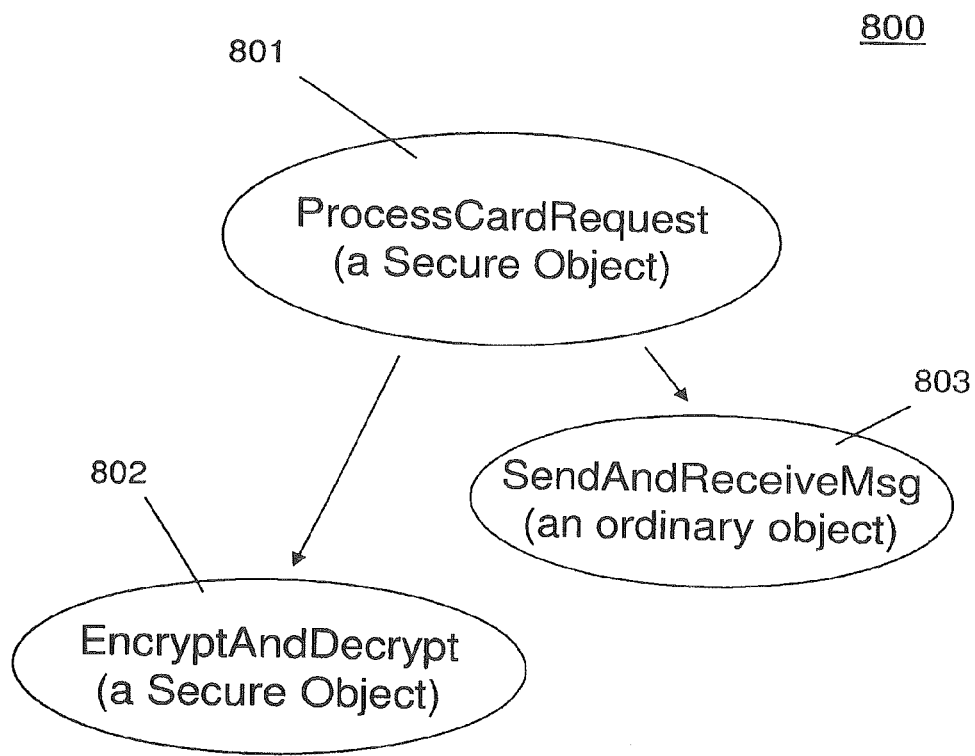
FIG. 8 illustrates how the Secure Object can call or send messages to other objects.

Secure Objects can call (or send messages to) other objects. In fact, they can make use of both secure objects and non-secure objects. An example of this is illustrated in the process 800 exemplarily shown in FIG. 8.

In this example, ProcessCardRequest 801 is a Secure object that contains sensitive credit card information. ProcessCardRequest 801 calls another Secure Object, EncryptAndDecrypt 802, to encrypt sensitive information for transmission to a remote system. ProcessCardRequest 801 then calls SendandReceiveMsg 803, an ordinary non-secure object, to send a message that has already been encrypted for transmission to the remote system.

Note that the object that encrypts and decrypts sensitive information should be a Secure Object since it needs to access sensitive information "in the clear". On the other hand, the Object that sends messages to a remote system can be an ordinary non-secure object if the data that it receives for transmission has already been encrypted for protection while 'in transit' between systems. Note too that when a Secure Object calls another object, the crypto key information needs to be setup appropriately for the called object.

This example illustrates another aspect of the Secure Object. As stated earlier, the private information in a Secure Object is almost always encrypted. On the other hand, the public information in a Secure Object is not encrypted—that is it is not encrypted under the Secure Object cryptography. But if the ProcessCardRequest class has a public field for storing the encrypted message that will be passed to the remote system, that field can be passed to the non-secure SendandReceiveMsg object and the SendandReceiveMsg object will see the same message that ProcessCardRequest sees since that field will not be 'encumbered' by the Secure Object cryptography.

In this design, sensitive information is never vulnerable. It is always protected either by the Secure Object cryptography or by the communications cryptography.

Additional Details

Interrupts and Process Dispatching

The state of the special crypto hardware that provides access to a Secure Object's private information must be saved when a Secure Object is interrupted. And the state must be restored later on when the Secure Object resumes execution. But since we do not want device drivers or process dispatching code or other operating system level code to have access to an Object's keys since that would compromise the Object's security, interrupt handlers and OS-level code will save and restore handles rather than keys—and the loading of a handle into a handle register will cause the appropriate key information to be loaded into the crypto hardware. The current state of the crypto handle will just be one more piece of the 'process context' that must be saved and restored when processes are suspended and resumed.

Swapping, Paging and Executables in the File System

When a process is in memory, the private information in its secure objects are encrypted as discussed above and the remaining code and data are in the clear. When swapped or paged out to disk, the process image has the same form: the secure objects are encrypted and the remaining code and data are not. So the secure objects are secure when swapped or paged without any special processing in the swapping or paging system.

As previously discussed, the encryption, decryption and integrity protection might be done as described in the above-identified co-pending application. However in this case, since the physical addresses of code and data may change when a process or portions of a process are swapped or paged to disk, the addresses that are used in the encryption, decryption and integrity checking will be based on virtual rather than physical addresses.

An executable file in the file system has the same protection that it has in memory: the private information in secure objects is encrypted and the other portions of the executable file are not. When the file is brought into memory to create a new process, no special processing is required.

Passing Arguments and Return Values

When one object calls another, the arguments and the return values normally must be "comprehensible" by both objects and in some cases a cryptographic transformation of these values may be required. There are several cases to consider:

1. An ordinary non-secure object calls another ordinary non-secure object. Arguments and return values are "in the clear" both in the calling object and the called object. No transformation required.
2. A secure object calls a non-secure object. In this case the fields in the secure object that are used to pass arguments to the non-secure object or receive the return value from the non-secure object should be public. (There would be no point in making information private in the secure object if it is exposed in the non-secure object.) These fields will be "in the clear" so no transformation is required.
3. A non-secure object calls a secure object. In this case the fields in the secure object that are used for the arguments that are passed and for the return value should be public. These fields will be "in the clear" and no transformation is required.
4. A secure object calls another secure object. In this case, private information that is passed in the call must be decrypted with the calling object's keys and re-encrypted with the called object's keys. This can be done in the esm instruction. Similarly, when a return value is passed to a private field in the calling object, that information must be decrypted using the called object's keys and re-encrypted with the calling object's keys. This can be done in the lsm instruction.

File System I/O

A Secure Object should also be able to store private information in and retrieve private information from a file system. And the private information should remain private while it is in the file system. This can be accomplished by calling a Secure Object to do secure reads from and secure writes to the file system. In addition to file descriptor, buffer and buflen arguments, say, a SecureWrite method could accept an argument or arguments for crypto key information so that the private information written to a file could be cryptographically protected to protect its confidentiality and integrity while in the file system. Similarly, a SecureRead method could accept an argument or arguments for crypto key information so that it could read and validate the integrity of private information that it reads from the file system. (This crypto key information would be stored in a private field or fields in the Secure Object that calls the SecureWrite and SecureRead methods.) SecureRead and SecureWrite could perform all the required cryptographic encryption, decryption and integrity checking while using 'standard' read and write system calls for the actual file system I/O. (The 'addresses' used in the File System I/O encryption and decryption could be the number of bytes from the beginning of a file.)

Caches

A Secure Object's private information also needs to be protected if it appears "in the clear" in an L1, L2 or L3 cache. In one implementation, the encryption and decryption occurs between the L1 and L2 caches as shown in FIG. 3. In this design, the private information in an L2 or 13 cache is protected cryptographically just as it is in external memory. In this design, private information is in the clear in the L1 cache, so we need to make sure that this cleartext private information is not available to any other software.

One possibility is to clear the L1 cache (or just those entries in the L1 cache that contain private information) on execution of an lsm instruction, when a Secure Object is interrupted or when a Secure Object makes a call to code outside the Secure Object. In a multicore design, the L1 cache (or caches) for a given CPU core would not be available to other CPU's.

In another design, the encryption and decryption is done between the CPU core and the L1 cache. In this case, private information in the L1 is protected cryptographically just as it is in external memory but encryption/decryption would have to be done whenever private information is loaded from or stored to the L1 cache.

Another design might involve an additional 'L0.5' cache between the L1 cache and the CPU. In this design, the L1, L2 and L3 caches would all contain the encrypted form of private information and the L0.5 would provide an additional level of cache that would be used and only used for the unencrypted form of private information in the execution of a secure object. The contents of the L0.5 cache would be cleared when a secure method returns, when it is interrupted or when the secure method makes a call to code outside the Secure Object.

Secure Processes

A Secure Object can be used at the process level to protect all of a process's private information over its entire lifetime including private information that the Secure Object stores in and retrieves from a file system—as discussed above. An esm instruction at the start of execution would setup the cryptographic protection that would be used until the process exits. When the process makes a call to external code such as a call to the operating system, the external code would execute without access to the Secure Object's keys as discussed previously.

Summary

We have described a novel approach for providing strong defenses against software-based attacks. The approach is based on a new construct, the Secure Object, in which private information really is private. A Secure Object's private information is protected for its entire lifecycle: while it's in memory, or paged out to disk, or written out to the file system. Private information is cryptographically protected from other software including privileged software like device drivers, operating systems and hypervisors. The crypto prevents other software from obtaining private information or modifying information without detection.

The Secure Object capability allows us to prove that sensitive information really is secure without having to prove the correctness of millions of lines of operating system, middleware and application code. We just need to prove the correctness of the mechanisms for implementing secure objects and the correctness of the design of a given secure object.

The Secure Object capability can be added to a processor in a way that is 'backwards compatible'. All existing code can continue to run without modification—and without any performance penalty. But new code can be written that leverages the Secure Object capability to provide much stronger security for sensitive information.

Exemplary Hardware Implementation

As previously stated, the microprocessor shown in FIG. 3 operates much like conventional microprocessors, as modified to incorporate the two new instructions esm and lsm, and the crypto engine, including its crypto registers and the capability to clear these registers under situations described above.

Figure 9:
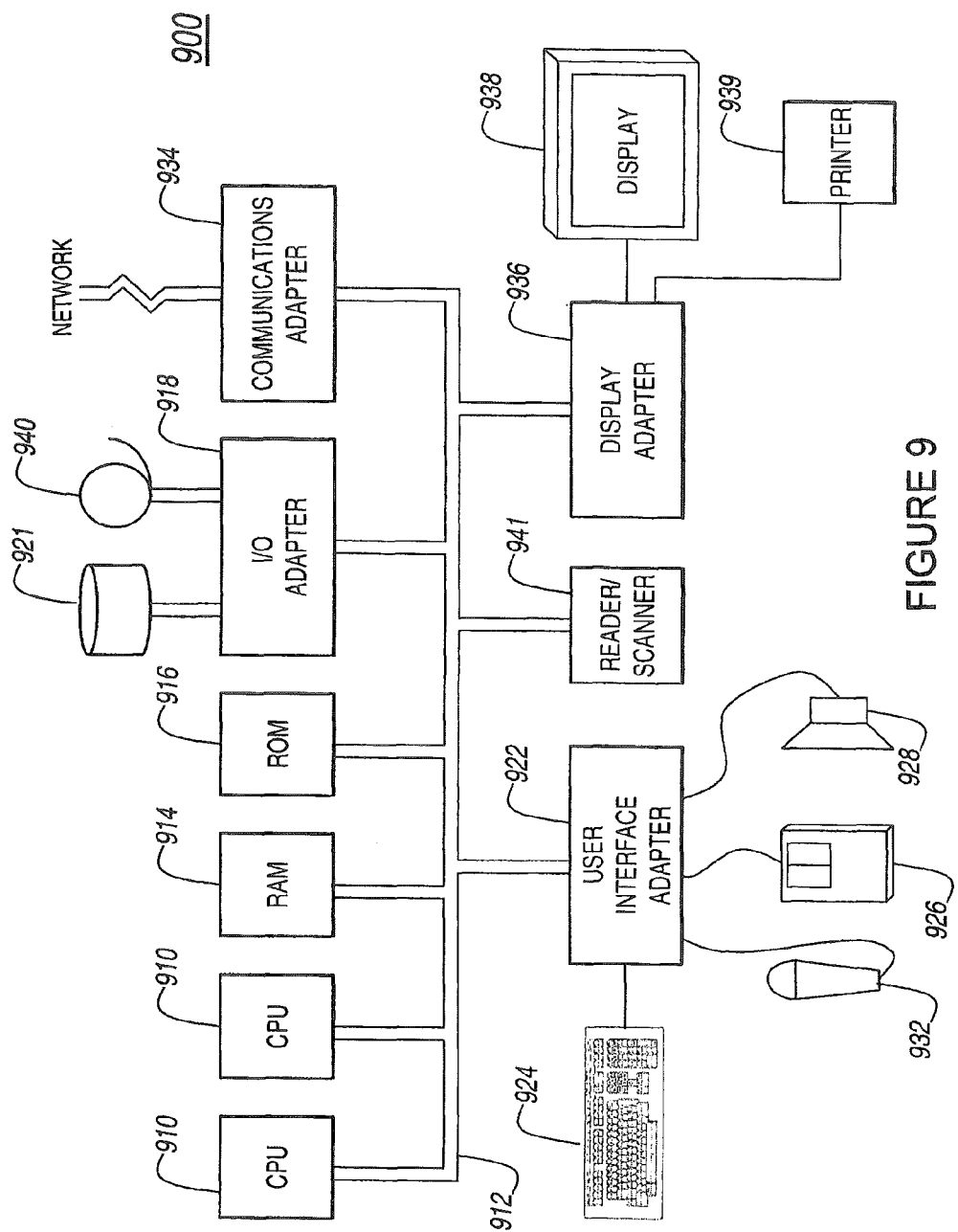
FIG. 9 illustrates an exemplary hardware/information handling system 900 for incorporating the present invention therein.

FIG. 9 illustrates a typical hardware configuration of an information handling/computer system in accordance with the invention and which preferably has at least one processor or central processing unit (CPU) 910, each having been implemented to execute the esm and lsm instructions.

The CPUs 910 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 910 and hardware above, to perform the method of the invention.

Figure 10:
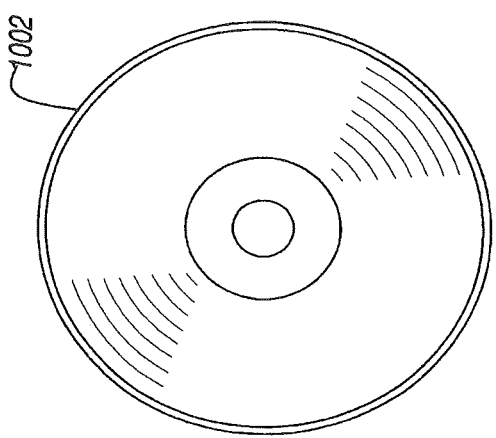
FIG. 10 illustrates a signal bearing storage medium 1000 (e.g., storage medium) for storing steps of a program of a method according to the present invention.
Figure 10:
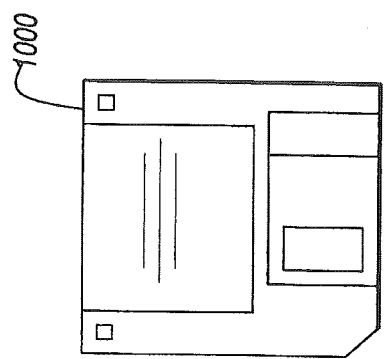

This signal-bearing storage media may include, for example, a RAM contained within the CPU 910, as represented by the fast-access storage for example. Alternatively, the instructions may be contained in another signal-bearing storage media, such as a magnetic data storage diskette 1000 (FIG. 10), directly or indirectly accessible by the CPU 910.

Whether contained in the diskette 1000, the computer/CPU 910, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including devices and memories used in transmission media such as communication links and wireless which incorporate storage devices for storage of instructions in various formats, such as digital or analog, as might be used in transmission of computer instructions. In an illustrative embodiment of the invention, the machine-readable instructions may comprise software object code.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

The invention claimed is:

1. A processor in a computer system, as coupled to a memory device, said processor comprising a mechanism supporting a Secure Object that comprises information that is cryptographically protected so that other software on said computer system cannot access or undetectably tamper with said information, thereby protecting both a confidentiality and an integrity of the Secure Object information from other software while making an unencrypted form of the Secure Object information available to the Secure Object itself during execution of the Secure Object, wherein said mechanism comprises:

a crypto engine that decrypts and integrity-checks Secure Object information as the Secure Object information moves into the processor from an external memory and encrypts and updates an integrity value for portions of the Secure Object information as the Secure Object information moves out of the processor to the external memory;

a protected key storage area, that is not accessible by software, used to store keys used for decryption and integrity-checking of Secure Object information when this information is moved into the processor from the external memory and for encryption of Secure Object information and generation of an integrity value as the information is moved out of the processor back to the external memory; and a machine instruction, as stored in said memory device, that is used to run a Secure Object as associated with a handle that is not usable with other software, the machine instruction using the handle to load a crypto key into the key storage area used by the crypto engine for decrypting the Secure Object.

2. The processor of claim 1, wherein, an integrity exception is generated if the handle is used with other software.

3. The processor of claim 1, said mechanism further comprising an instruction in an instruction set that controls the processor, the instruction permitting access to the protected key storage area to obtain a key associated with the handle.

4. The processor of claim 1, wherein said machine instruction comprises an esm (enter secure mode) instruction that includes a handle operand field containing a value to be used as a handle associated with a Secure Object.

5. The processor of claim 1, wherein said handle includes an encrypted value that comprises integrity information for the Secure Object that is not usable by other software.

6. The processor of claim 4, wherein, when the processor executes an esm instruction, the esm instruction from the processor instruction set uses the value in the handle operand field of the esm instruction and maps this handle operand value to crypto key information and loads the crypto key information into a register of the crypto engine.

7. The processor of claim 4, wherein, when the processor executes an esm instruction, the machine instruction from the processor instruction set uses a system key value, which is stored in the protected key storage area so as to not be accessible by other software, the system key value being used to decrypt the value in the handle operand field of the esm instruction to obtain Object key information for the Secure Object, and loads the Object key information into a register of the crypto engine, for decrypting private information of the Secure Object.

8. The processor of claim 1, further comprising at least one cache structure associated with the processor and located between the processor and the crypto engine, wherein private information of a Secure Object being executed by the processor is in a decrypted state inside the at least one cache structure, and wherein the private information of the Secure Object being executed by the processor is in an encrypted state in any other cache structure or memory structure of the computer system or in any other memory outside the computer system.

9. The processor of claim 1, wherein, when a Secure Object includes one or more public information portions, in which information therein is not cryptographically protected, and one or more private information portions, in which information therein is cryptographically protected when outside said processor, wherein any portion of the Secure Object including private information is decrypted as it enters into the processor and is encrypted as it leaves the processor, and wherein public information of the Secure Object is not encrypted even when stored in a memory outside the processor.

10. A method of protecting private information on a computer system, said method comprising executing a mechanism supporting a Secure Object comprising information that is cryptographically protected so that other software on the computer system cannot access or undetectably tamper with the information, thereby protecting both a confidentiality and an integrity of the Secure Object information from other software while making an unencrypted form of the Secure Object information available to the Secure Object itself during execution of the Secure Object, wherein said mechanism:

uses a machine instruction to run a Secure Object, said machine instruction using a handle operand that is not usable with other software, to load key information into a crypto engine for decrypting the Secure Object information;

decrypts and integrity-checks portions of Secure Object information as the Secure Object information moves into the processor from an external memory; and encrypts and updates an integrity value for portions of the Secure Object information as the Secure Object information moves out of the processor to the external memory.

11. The method of claim 10, wherein an integrity exception is generated if the handle is used with other software.

12. The method of claim 10, said mechanism further comprising an instruction in an instruction set that controls the processor, the instruction permitting access to the protected key storage area to obtain a key associated with the handle.

13. The method of claim 10, wherein said machine instruction comprises an esm (enter secure mode) instruction that includes a handle operand field containing a value to be used as a handle associated with a Secure Object.

14. The method of claim 10, wherein said handle includes an encrypted value that comprises integrity information for the Secure Object and that is not usable by other software.

15. The method of claim 13, wherein, when the processor executes an esm instruction, the esm instruction from the processor instruction set uses the value in the handle operand field of the esm instruction and maps this handle operand value to crypto key information and loads the crypto key information into a register of the crypto engine.

16. The method of claim 13, wherein, when the processor executes an esm instruction, the machine instruction from the processor instruction set uses a system key value, which is stored in the protected key storage area so as to not be accessible by other software, the system key value being used to decrypt the value in the handle operand field of the esm instruction to obtain Object key information for the Secure Object, and loads the Object key information into a register of the crypto engine, for decrypting private information of the Secure Object.

17. A data structure, as used with a machine instruction that is used to run said Secure Object that is associated with a handle that is not usable with other software, the machine instruction using the handle to load a crypto key into a crypto engine for decrypting the Secure Object wherein an integrity exception is generated if the handle is used with other software, and as tangibly embodied in a non-transitory machine-readable storage medium, said data structure comprising a Secure Object comprising information for a computer system that is cryptographically protected so that other software on the computer system will not be able to access or undetectably tamper with the information, thereby protecting both a confidentiality and an integrity of the Secure Object information from other software while making an unencrypted form of the Secure Object information available to the Secure Object itself during execution of the Secure Object, such that Secure Object information is decrypted and integrity-checked as the Secure Object information moves into a processor from an external memory and is encrypted and an integrity value is generated as Secure Object information moves out of the processor to the external memory.

18. The data structure of claim 17, as used with an esm (enter secure mode) instruction that includes a handle operand field that includes an encrypted value that comprises integrity information for the Secure Object and that is not usable by other software,
- wherein information that is cryptographically protected comprises private information of said Secure Object,
- wherein any portion of said Secure Object including private information is decrypted as it enters into the processor for processing and is encrypted as it leaves the processor, and
- wherein, when a Secure Object includes one or more portions of public information, such public information of said Secure Object is not encrypted when stored in a memory outside the processor.

* * * * *